United States Patent [19]

Brandner et al.

[11] 4,418,668
[45] Dec. 6, 1983

[54] ELECTRONIC IGNITION PULSE GENERATOR

[75] Inventors: Burkhard Brandner, Werdohl; Manfred Knüfelmann, Düsseldorf; Reinhold Blauhut, Eggenstein-Leopoldshafen, all of Fed. Rep. of Germany

[73] Assignee: Atlas Aluminium-Fahrzeugtechnik GmbH, Werdohl, Fed. Rep. of Germany

[21] Appl. No.: 325,734

[22] Filed: Nov. 30, 1981

[30] Foreign Application Priority Data

Dec. 1, 1980 [DE] Fed. Rep. of Germany ....... 3045246

[51] Int. Cl.³ .............................................. F02P 5/04
[52] U.S. Cl. ................................... 123/416; 123/488; 123/494; 123/417
[58] Field of Search ............... 123/494, 488, 487, 486, 123/480, 416, 417

[56] References Cited

U.S. PATENT DOCUMENTS

| | | | |
|---|---|---|---|
| 3,831,563 | 8/1974 | Brittain | 123/488 |
| 3,927,304 | 12/1975 | Wentworth | 123/488 |
| 3,941,103 | 3/1976 | Hartig | 123/416 |
| 4,009,697 | 3/1977 | Chateau | 123/416 |
| 4,036,190 | 7/1977 | Bigliani | 123/416 |
| 4,357,919 | 11/1982 | Hattori | 123/416 |

Primary Examiner—Ronald B. Cox
Attorney, Agent, or Firm—Joseph A. Geiger

[57] ABSTRACT

An electronic ignition pulse generator for internal combustion engines comprising an angle-of-rotation pulse giver feeding a succession of angle pulses and a cycle signal to an ignition point computer and featuring a novel adjustment pulse generator with a binary counter controlled by the cycle signal, by a pressure transducer, voltage comparator and RS flip-flop gate, to count angle pulses, until the count corresponds to the pressure level in the engine intake duct, thereby producing a pressure-reflective adjustment count for the computer. A throttle switch at the carburetor blocks the counter during closed-throttle operation.

8 Claims, 2 Drawing Figures

ELECTRONIC IGNITION PULSE GENERATOR

BACKGROUND OF THE INVENTION

1. Field of the Invention

The present invention relates to electronic ignition control devices for internal combustion engines and, more particularly, to an electronic ignition pulse generator which uses an angle-of-rotation pulse giver feeding pulses to a computer for the determination of the ignition point and an adjustment pulse generator producing adjustment pulses for the computer which reflect the pressure in the engine intake duct, to obtain an output related adjustment of the ignition point.

2. Description of the Prior Art

An ignition pulse generator of the type mentioned above is disclosed in the German Pat. No. 23 39 755 and in the corresponding U.S. Pat. No. 3,941,103. This device teaches the adjustment of the ignition point in response to changes in engine speed and in response to other operational parameters, such as the pressure in the engine intake duct. Changing pressure values in the intake duct are used to control an auxiliary function generator which produces correspondingly changing supplementary pulses.

In practical use, this approach is fraught with considerable difficulties in connection with the balancing of multiple pulse generators and the synchronization of their pulse frequencies, especially under conditions of widely fluctuating temperature levels.

SUMMARY OF THE INVENTION

Underlying the present invention is the objective of improving upon the above-mentioned ignition pulse giver in such a way that it becomes possible to also use the angle-of-rotation pulses for the generation of pressure-reflective adjustment pulses. A further aim is to obtain a high degree of accuracy in the measurement of the negative pressure in the engine intake duct.

The present invention proposes to attain this objective by suggesting an improved electronic ignition pulse generator which is characterized by the following combination of features:

(a) A resettable $2^n$-binary counter of the adjustment pulse generator has a collection line with n separate lines for the transmission of the pressure-reflective count leading to the computer;

(b) To the collection line is also connected a D/A converter the exit line of which is connected to a voltage comparator;

(c) A pressure transducer measuring the pressure level in the engine intake duct supplies a pressure-reflective signal to the second entry of the voltage comparator;

(d) The line carrying the angle-of-rotation pulses is connected to the count entry of the binary counter; and (e) The set-exit of an RS flip-flop gate is connected to the count blocking entry of the binary counter, to the set-entry of the RS-sweep circuit is connected the cycle signal line of the angle-of-rotation generator, and to the reset-entry are connected the full-count exit of the binary counter and the exit of the voltage comparator.

This novel arrangement makes it possible to count angle-of-rotation pulses into the binary counter until the exit count of the latter corresponds to the signal level of the pressure transducer, at which point the binary counter is stopped. This particular count represents a measure of the pressure level in the intake duct, and it can be used as an adjustment parameter for the computer.

The binary counter thus operates as an adjustment pulse giver. This arrangement also ffers a high degree of accuracy in the measurement of the negative pressure in the engine intake duct. The data values of the adjustment pulses which are available at the collection line can now be received by the computer in synchronism with each cycle.

In a preferred embodiment, the invention further suggests the use of a pressure transducer of the piezo-electric type. This approach further increases the accuracy of pressure measurement.

The proposed arrangement also offers the possibility of measuring a positive pressure in the engine intake duct and of providing a corresponding output-related adjustment of the ignition timing characteristic in the case of supercharged intake conditions, when the engine is equipped with a turbocharger, for example. For this purpose, the invention suggests the use of a second voltage comparator into which are fed the exit voltage of the pressure transducer and a reference voltage.

The reference voltage is preferably obtained by means of a voltage separator, thus offering the possibility of conveniently presetting the reference voltage in accordance with the particular operational requirements.

The present invention still further suggests an adjustment of the preset entries of the binary counter to a preset-count of "1". This means that the count of adjustment pulses will always start out from this preset-count of "1". The binary counter will count up to $2^n$ adjustment pulses.

In order to assure resetting of the binary counter in phase with the angle-of-rotation pulses, the invention further suggests to connect the cycle signal line to the count reset entry of the binary counter, via a signal inverter.

Lastly, the invention also offers the possibility of blocking the generation of adjustment pulses in the push-mode of engine operation, i.e. when the engine acts as a brake on a coasting vehicle. This result is achieved by means of a throttle switch which is associated with the carburetor and connected to the zero-reset entry of the binary counter, via an inverter. The closed condition of the carburetor throttle produces a continuous zero-reset signal for the binary counter and the latter remains on the count "0", so that the computer will set the ignition point accordingly.

BRIEF DESCRIPTION OF THE DRAWINGS

Further special features and advantages of the invention will become apparent from the description following below, when taken together with the accompanying drawings which illustrate, by way of example, a preferred embodiment of the invention represented in the various figures as follows.

DESCRIPTION OF THE PREFERRED EMBODIMENT

Figure 1:
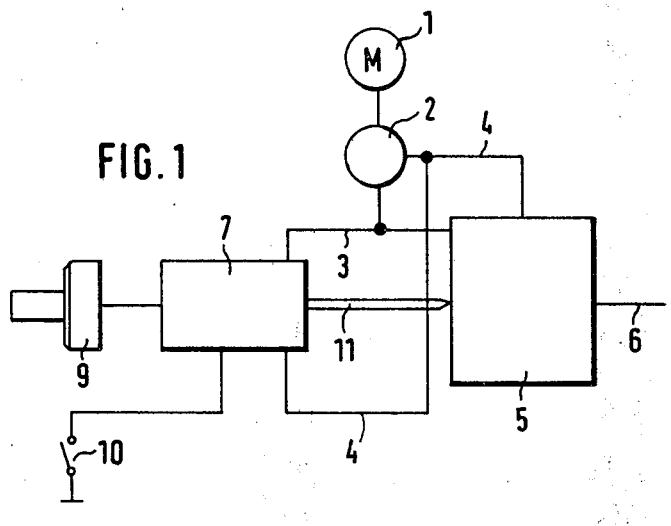
FIG. 1 is a block diagram showing the arrangement of an electronic ignition pulse generator embodying the invention in conjunction with a carburetor-equipped internal combustion engine.

The block diagram of FIG. 1 shows a carburetor-equipped internal combustion engine 1 to which is connected an angle-of-rotation pulse giver 2. This pulse giver 2 may be arranged in the area of the flywheel of the crankshaft, sensing regularly spaced markings of the rotating flywheel. The angle-of-rotation pulses produced by the pulse giver 2 are available at the pulse line 3.

The pulse giver 2 further produces a cycle signal which is available at the cycle signal line 4. This signal represents a fixed angle or point in time in the operational cycle of the engine. Both the pulse line 3 and the cycle signal line 4 lead to a computer 5 which determines the correct ignition point and sends an appropriate ignition pulse at the ignition pulse line 6.

The pulse line 3 and the cycle signal line 4 have branches leading to an adjustment pulse generator 7 of which the central component is a $2^n$-binary counter 8. The binary counter 8 of the exemplary embodiment under discussion has a count capacity of "16", meaning that n equals "4". The adjustment pulse generator 7 receives pulse-controlling inputs from a pressure transducer 9 and from a throttle switch 10, both of which are associated with the carburetor of the internal combustion engine.

As will be described further below, the binary counter 8 of the adjustment pulse generator 7 counts a certain number of angle-of-rotation pulses, in response to said pulse-controlling inputs. The resultant pulse count, reflective of these inputs, is then transmitted over the collection line 11 to the computer 5.

Figure 2:
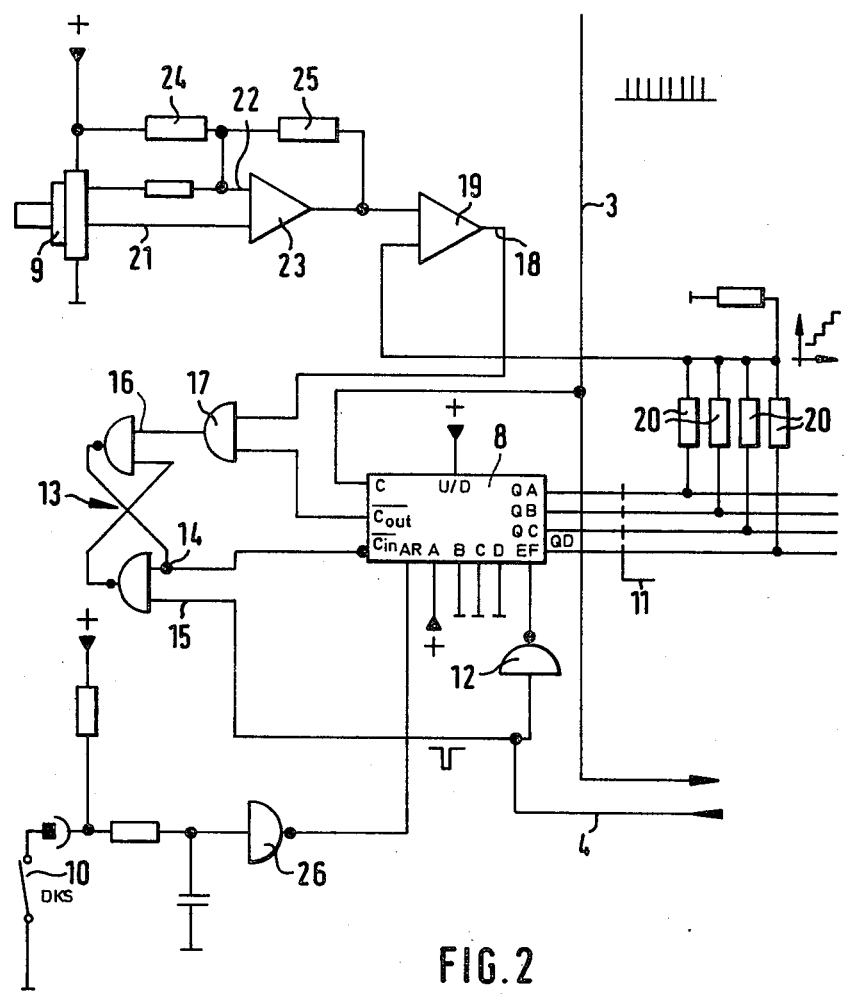
FIG. 2 is a schematic circuit diagram of the adjustment pulse giver.

FIG. 2 shows details of the adjustment pulse generator 7 of the invention in a schematic circuit diagram. At the center of this diagram is the $2^n$-binary counter 8 with its four counter exits QA, QB, QC and QD to which are connected the four single conductors of the collection line 11. These four single conductors of line 11 are carrying separate voltage levels, in accordance with the binary levels of the system, so that they can represent sixteen ($2^n$) separate binary stages.

The binary counter 8 also has four preset entries A, B, C and D of which the entry A is connected to a reference voltage, while the other entries are grounded. This connection produces a preset-count of "1" at the start of each counting cycle, so that, whenever the binary counter 8 receives a pulse at its count-reset entry EF, its count is reset to the preset-count of "1". The binary counter 8 also has a zero-reset entry AR through which the count can be reset to "0", independently of any other preset-count setting at the preset entries A-D.

On the count input side, the binary counter 8 has a count-blocking entry $\overline{C_{in}}$ for the reception of a count-blocking signal, a count entry C for the reception of the count pulses, and a full-count signal exit $\overline{C_{out}}$, where a signal is available when the full count has been reached.

A branch of the pulse line 3 carrying the angle-of-rotation pulses is connected to the count entry C of counter 8. The cycle signal line 4 is connected to the count-reset entry EF, over an intermediate signal inverter 12. The set-exit 14 of the RS flip-flop gate 13 is connected to the count-blocking entry $\overline{C_{in}}$ of the binary counter 8, carrying an inverted signal. At the set-entry 15, the RS flip-flop gate 13 receives the cycle signal from the cycle signal line 4, and its reset-entry 16 receives signals from an AND-gate to which are connected the full-count exit $\overline{C_{out}}$ of the binary counter 8 and the exit 18 of a voltage comparator 19.

The voltage comparator 19 receives at one of its entries a count-reflecting signal from a D/A converter 20 which, reading the count at the count collection line 11, converts it into an analog voltage. At its second entry, the voltage comparator 19 receives a voltage reflecting the actual negative pressure in the engine intake duct, downstream of the carburetor. At that location is arranged a pressure transducer 9, preferably of the piezoelectric type.

The output signal of the pressure transducer 9 is first fed to a second voltage comparator 23, via the line 21, where it is compared with an adjustable, predetermined reference voltage. This reference voltage is set by means of a pair of voltage separator resistances 24 and 25, on opposite sides of the reference voltage entry 22 of the voltage comparator 23. The output signal of this comparator is then fed to the second entry of the first voltage comparator 19. This pressure measurement signal is an uninterrupted signal. The reference pressure can be set in such a way that the device will also respond to positive pressure in the engine intake duct, when a supercharger is used.

On the carburetor of the internal combustion engine is further arranged a throttle switch 10 which controls a signal voltage at the entry of an inverter 26. The latter receives a fixed voltage in the open condition of the throttle switch 10 and zero voltage in the closed condition. The exit side of the inverter 26 is connected to the zero-reset AR entry of the binary counter 8.

In operation, the rotating crankshaft of the internal combustion engine produces, during each rotation, a cycle signal of fixed phase value and a fixed number of angle-of-rotation pulses. The cycle signal, received over the cycle signal line 4, fulfills a dual function: Through the inverter 12, it resets the binary counter 8 at its entry EF to the present count of "1", while at the same time switching the RS flip-flop gate 13 to its set-condition, so that the count-blocking entry $\overline{C_{in}}$ of the counter 8 receives a zero-voltage. As a result, the binary counter 8 starts counting the angle-of-rotation pulses which are fed to it over the pulse line 3 and the count entry C.

The number of pulses received by the counter 8 reflects itself as a binary count in the form of changing binary states on the counter exits QA, QB, QC and QD for the four-conductor collection line 11. Reading the binary count from the collection line 11, the D/A converter 20 produces a correspondingly increasing analog voltage which is fed to an entry of the first voltage comparator 19. There, this incrementally increasing voltage is compared with the voltage signal originating from the pressure transducer 9.

The voltage output at the exit 18 of the voltage comparator 19 is reduced to zero, as soon as the count-reflective voltage received from the D/A converter 20 exceeds the pressure-reflective voltage received from the transducer 9. This zero-voltage reaches the RS flip-flop gate 13 over the AND-gate 17 and the reset-entry 16, switching it to the reset-condition, so that the binary counter 8 receives a signal at its count-blocking entry $\overline{C_{in}}$. The count at which the binary counter has been blocked thus reflects a digital measure of the negative pressure in the engine intake duct, and this measure remains unchanged for the duration of the remainder of the engine cycle, ready for use by the ignition computer as a timing adjustment input.

The analog voltage produced by the D/A converter 20 has an upper limit which corresponds to the full-count $2^n-1$ of the binary counter 8, which is "15" for the device under consideration. If it happens that the voltage received by the voltage comparator 19 from the pressure transducer 9 is higher than this full-count voltage, then the output voltage at the comparator exit 18 will fail to reach a zero value. In this case, however, the binary counter 8 will produce a signal at its full-count exit $\overline{C_{out}}$, as soon as it reaches the full count, with the result that a switching signal at the reset entry 16 of the RS flip-flop gate is now received from the binary counter 8 and the latter is blocked at the full count. This full count remains available at the collection line 11, until read by the computer. The described special condition applies particularly to supercharged engine operation.

A general precondition to the operation of the adjustment pulse generator as described is that the throttle switch 10 at the carburetor throttle remains open, so that the zero-reset entry AR of the binary counter 8 receives a zero-voltage from the voltage converter 26. But, as soon as the switch 10 is closed, and for the duration of the closure, the binary counter 8 receives a voltage at its entry AR, so that the count is maintained at "0". This condition is present, when the carburetor throttle is closed, especially when the engine operates in a push-mode, producing a braking action on a coasting vehicle. Accordingly, a closed carburetor throttle means a continuous "0"-count readout at the collection line 11.

The binary readouts of the counter 8 are available as timing adjustment pulses for the ignition computer. However, the proposed adjustment pulse generator also offers the possibility to use certain count values to trigger the computer to perform specific reading functions, or to execute sub-program computations. These possibilities enhance the achievement of an optimal ignition characteristic under changing operating conditions of the internal combustion engine. As described, the electronic ignition pulse generator of the invention is not only adapted for operation under conditions of negative intake pressure, as is the case with a conventional engine, but it also can be used under conditions of positive intake pressure, as is the case with a supercharged engine.

It should be understood, of course, that the foregoing disclosure describes only a preferred embodiment of the invention and that it is intended to cover all changes and modifications of this example of the invention which fall within the scope of the appended claims.

We claim the following:

1. An adjustment pulse generator for the electronic ignition pulse generator of an internal combustion engine, particularly of the type which has a carburetor in its fuel system, which ignition pulse generator includes an angle-of-rotation pulse generator producing a sequence of pulses in synchronism with the rotation of a shaft of the engine and a cycle signal of fixed phase value which serves as a reference point in each cycle, and an ignition point computer determining the timing of an ignition signal in terms of a variable phase lag from said cycle signal, in accordance with timing adjustment parameters which reflect changing conditions of engine operation such as engine speed and engine intake pressure, the adjustment pulse generator comprising in combination:

a resettable $2^n$-binary counter adapted to receive and count the angle-of-rotation pulses, the counter including at least one reset entry, a count entry, a count-blocking entry, and a full-count exit, as well as a collection line with n separate conductors for the transmission of an adjustment pulse count to the ignition point computer;

a digital-to-analog converter connected to the collection line of the binary counter and producing a corresponding incrementally increasing count-reflective analog voltage;

a pressure transducer measuring the air pressure in the engine intake duct by producing a corresponding pressure-reflective voltage;

a first voltage comparator comparing the count-reflective and pressure-reflective voltages and producing an output signal corresponding to their difference; and an RS flip-flop gate having a set-entry receiving the cycle signal, a set-exit connected to the count-blocking entry of the binary counter, and a reset-entry connected to the exit of the first voltage comparator and to the full-count exit of the binary counter.

2. An adjustment pulse generator as defined in claim 1, wherein
the pressure transducer is of the piezoelectric type.

3. An adjustment pulse generator as defined in claim 1, further comprising
a second voltage comparator receiving at its two entries the pressure-reflective voltage output of the pressure transducer and a predetermined reference voltage, respectively, the comparator exit being connected to an entry of the first voltage comparator.

4. An adjustment pulse generator as defined in claim 3, further comprising
an adjustable voltage separator for the establishment of said reference voltage.

5. An adjustment pulse generator as defined in any one of claims 1 through 4, wherein
the exit of the first voltage comparator and the full-count exit of the binary counter are connected to the reset entry of the RS flip-flop gate via an AND-gate.

6. An adjustment pulse generator as defined in claim 5, wherein
the binary counter has a plurality of preset entries which are connected for a preset count of "1".

7. An adjustment pulse generator as defined in claim 6, wherein
the binary counter has a reset entry receiving the cycle signal from the angle-of-rotation pulse giver, after inversion of the signal by an inverter, to reset the counter to the preset-count of "1".

8. An adjustment pulse generator as defined in claim 5, further comprising
a throttle switch associated with the carburetor throttle of the internal combustion engine; and wherein the binary counter further includes a zero-reset entry controlled by the throttle switch in such a way that the counter is maintained at a count of "0", for as long as the throttle switch is closed.

* * * * *